(12) United States Patent
Awad et al.

(10) Patent No.: US 10,671,546 B2
(45) Date of Patent: Jun. 2, 2020

(54) CRYPTOGRAPHIC-BASED INITIALIZATION OF MEMORY CONTENT

(71) Applicant: Hewlett Packard Enterprise Development LP, Houston, TX (US)

(72) Inventors: Amro J. Awad, Princeton, NJ (US); Pratyusa K. Manadhata, Piscataway, NJ (US); Stuart Haber, New York, NY (US); William G. Horne, Lawrenceville, NJ (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 8 days.

(21) Appl. No.: 15/573,597

(22) PCT Filed: Sep. 30, 2015

(86) PCT No.: PCT/US2015/053320
§ 371 (c)(1),
(2) Date: Nov. 13, 2017

(87) PCT Pub. No.: WO2017/058221
PCT Pub. Date: Apr. 6, 2017

(65) Prior Publication Data
US 2018/0137062 A1   May 17, 2018

(51) Int. Cl.
*G06F 12/14* (2006.01)
*G06F 21/62* (2013.01)
(Continued)

(52) U.S. Cl.
CPC ........ *G06F 12/1408* (2013.01); *G06F 3/0604* (2013.01); *G06F 3/0632* (2013.01);
(Continued)

(58) Field of Classification Search
CPC .. G06F 12/1408; G06F 3/0604; G06F 3/0632; G06F 3/0685; G06F 12/0802;
(Continued)

(56) References Cited

U.S. PATENT DOCUMENTS 5,594,689 A * 1/1997 Kato ................... G11C 16/344
365/185.09
5,915,025 A   6/1999 Taguchi et al.
(Continued)

FOREIGN PATENT DOCUMENTS

| CN | 103026347 A | 4/2013 |
|---|---|---|
| EP | 2797003 | 10/2014 |
| WO | WO-2005036406 A1 | 4/2005 |

OTHER PUBLICATIONS

Jin et al., An Encryption Approach to Secure Modification and Deletion for Flash-based Storage, Nov. 2014, IEEE Transactions on Consumer Electronics, vol. 60, No. 4, pp. 662-667 (Year: 2014).*
(Continued)

*Primary Examiner* — Kenneth W Chang
(74) *Attorney, Agent, or Firm* — Hewlett Packard Enterprise Patent Department

(57) ABSTRACT

A technique includes receiving a request to initialize a region of a memory. Content that is stored in the region is encrypted based at least in part on a stored nonce value and a key. The technique includes, in response to the request, performing cryptographic-based initialization of the memory, including altering the stored nonce value to initialize the region of the memory.

19 Claims, 6 Drawing Sheets

(51) Int. Cl.
  *G06F 21/79* (2013.01)
  *G06F 21/60* (2013.01)
  *G06F 3/06* (2006.01)
  *G06F 12/0802* (2016.01)

(52) U.S. Cl.
  CPC ........ *G06F 3/0685* (2013.01); *G06F 12/0802* (2013.01); *G06F 21/602* (2013.01); *G06F 21/62* (2013.01); *G06F 21/79* (2013.01); *G06F 2221/2107* (2013.01); *G06F 2221/2113* (2013.01); *G06F 2221/2125* (2013.01); *G06F 2221/2143* (2013.01); *G06F 2221/2149* (2013.01)

(58) Field of Classification Search
  CPC ........ G06F 21/602; G06F 21/62; G06F 21/79; G06F 2221/2107; G06F 2221/2113; G06F 2221/2125; G06F 2221/2143; G06F 2221/2149
  See application file for complete search history.

(56) References Cited

U.S. PATENT DOCUMENTS

| | | | |
|---|---|---|---|
| 8,478,974 | B2 | 7/2013 | Wilson et al. |
| 2004/0042620 | A1* | 3/2004 | Andrews .............. H04L 9/0894 380/286 |
| 2005/0129235 | A1* | 6/2005 | Little .................. G06F 12/0253 380/255 |
| 2006/0080554 | A1* | 4/2006 | McDonald .......... G06F 21/6254 713/189 |
| 2008/0066075 | A1* | 3/2008 | Nutter ..................... G06F 9/485 718/107 |
| 2008/0140910 | A1* | 6/2008 | Flynn .................... G06F 13/426 711/100 |
| 2011/0293097 | A1 | 12/2011 | Maino et al. |
| 2011/0296201 | A1* | 12/2011 | Monclus ................. G06F 21/53 713/190 |
| 2012/0079289 | A1 | 3/2012 | Weng et al. |
| 2012/0278564 | A1* | 11/2012 | Goss ................... G06F 12/0253 711/155 |
| 2014/0068277 | A1 | 3/2014 | Metzger |
| 2014/0126721 | A1 | 5/2014 | Baek et al. |
| 2014/0247944 | A1 | 9/2014 | Kocher et al. |
| 2014/0281110 | A1 | 9/2014 | Duluk, Jr. et al. |
| 2014/0281587 | A1* | 9/2014 | Ignatchenko ........... G06F 21/64 713/193 |
| 2014/0281588 | A1 | 9/2014 | Vogan et al. |
| 2015/0002900 | A1 | 1/2015 | Cochran et al. |
| 2015/0039839 | A1 | 2/2015 | LeMire et al. |
| 2015/0039905 | A1 | 2/2015 | Griswold et al. |
| 2015/0074426 | A1 | 3/2015 | Jean |

OTHER PUBLICATIONS

Extended European Search Report, EP Application No. 15905603.5, dated Apr. 20, 2018, pp. 1-11, EPO.
International Search Report and Written Opinion, International Application No. PCT/US2015/053320, dated Jun. 30, 2016, pp. 1-10, KIPO.
"Pre-Faulting and Zeroing Optimizations", available online at <https://web.archive.org/web/20161027104758/https://www.freebsd.org/doc/en_us.iso8859-1/articles/vm-design/prefault-optimizations.html>, Oct. 27, 2016, 1 page.
Amit Singh. "Mac OS X Internals: A Systems Approach", Addison-Wesley Professional, 2006, 1154 pages.
Bennett et al., "The netflix prize", In in KDD Cup and Workshop in conjunction with KDD, 2007, 4 pages.
Bhandari et al., "Implications of cpu caching on byte-addressable non-volatile memory programming", Technical report, 2012, 7 pages.
Binkert et al., "The gem5 simulator", SIGARCH Comput. Archit. News, vol. 39, No. 2, pp. 1-7, Aug. 2011, ISSN 0163-5964. doi: 101145/20247162024718. URL http://doi.acm.org/10.1145/2024716.2024718.
Bovet et al., "Understanding the Linux Kernel", Oreilly & Associates Inc, 2005, available online at <http://www.staroceans.org/kernel-and-driver/OReilly%20-%20Understanding%20the%20Linux%20kernel%20-%203rd%20Ed..pdf>, 43 pages.
Calhoun et al., "Optimizing Kernel Block Memory Operations", 2006, 8 pages.
Chakrabarti et al., "Atlas: Leveraging locks for non-volatile memory consistency", In Proceedings of the 2014 ACM International Conference on Object Oriented Programming Systems Languages & Applications, pp. 433-452, ACM, 2014.
Chet Douglas, "RDMA with byte-addressable PM: RDMA Write Semantics to Remote Persistent Memory", Dec. 2, 2014, 7 pages.
Chhabra et al., i-nvmm: A secure non-volatile main memory system with incremental encryption. In Proceedings of the 38th Annual International Symposium on Computer Architecture, ISCA '11, pp. 177-188.
Chow et al., "Shredding your garbage: Reducing data lifetime through secure deallocation", In Proceedings of the 14th Conference on USENIX Security Symposium—vol. 14, SSYM'05, 2005, 16 pages.
Li et al., "Exploring high-performance and energy proportional interface for phase change memory systems", IEEE , 2013.
Gonzalez et al., "Powergraph: Distributed graph-parallel computation on natural graphs", In Proceedings of the 10th USENIX Conference on Operating Systems Design and Implementation, OSDI'12, pp. 17-30.
HP Labs, "The machine: A new kind of computer", available online at <https://web.archive.org/web/20150108051127/http://www.hpl.hp.com/research/systems-research/themachine/>, Jan. 8, 2015, 3 pages.
Huai et al., "Observation of spin-transfer switching in deep submicron-sized and low-resistance magnetic tunnel junctions," Applied physics letters, vol. 84, No. 16, 2004, pp. 3118-3120.
Intel, "Software Guard Extensions Programming Reference", Sep. 2013, 156 pages.
Jiang et al., "Architecture support for improving bulk memory copying and initialization performance", In Proceedings of the 2009 18th International Conference on Parallel Architectures and Compilation Techniques, PACT '09, 2009, pp. 169-180.
Lewis et al., "Avoiding initialization misses to the heap" In Computer Architecture, 2002. Proceedings. 29th Annual International Symposium on Computer architecture, pp. 183-194, 2002.
Liu et al., "NVM Duet: Unified working memory and persistent store architecture", ASPLOS '14, pp. 1-34.
Moraru et al., Persistent, Protected and cached: Building blocks for main memory data stores. Work, 2012, 28 pages.
Muralimanohar et al., "Cacti 6.0: A tool to model large caches", HP Laboratories, vol. 27, 2009, 24 pages.
Nair et al., "Archshield: Architectural framework for assisting dram scaling by tolerating high error rates," In Proceedings of the 40th Annual International Symposium on Computer Architecture, ISCA '13, 2013, pp. 72-83.
Novark et al., "Automatically correcting memory errors with high probability", In Proceedings of the 2007 ACM SIGPLAN Conference on Programming Language Design and Implementation, ACM. Press, 2007, 11 pages.
Qureshi et al., "Enhancing lifetime and security of pcm-based main memory with start-gap wear leveling", In Microarchitecture, 2009. MICRO-42. 42nd Annual IEEE/ACM International Symposium on Microarchitecture, pp. 14-23, Dec. 2009.
Rogers et al., "Using address independent seed encryption and bonsai merkle trees to make secure processors os- and performance-friendly", In Proceedings of the 40th Annual IEEE/ACM International Symposium on Microarchitecture, MICRO 40, 2007, pp. 183-196.
Russinovich et al., "Windows Internals: Including Windows Server 2008 and Windows Vista, Fifth Edition," Microsoft Press, 5th edition, 2009,, 1263 pages.

(56) References Cited

OTHER PUBLICATIONS

Sartor et al., "Cooperative cache scrubbing", In Proceedings of the 23rd international conference on Parallel architectures and compilation, pp. 15-26. ACM, 2014.

Seshadri et al., "Rowclone: Fast and energy-efficient in-dram bulk data copy and initialization", In Proceedings of the 46th Annual IEEE/ACM International Symposium on Microarchitecture, MICRO-46, 2013, pp. 185-197.

Understanding Memory Resource Management in VMware vSphere® 5.0, Performance Study, Technical White Paper, Aug. 24, 2011, 29 pages.

Valat et al., "Introducing kernel-level page reuse for high performance computing", In Proceedings of the ACM SIGPLAN Workshop on Memory Systems Performance and Correctness, Article No. 3, ACM, 2013, 9 pages.

William Stallings, Cryptography and Network Security (6th ed.), 2014, 758 pages.

Yan et al., "Improving cost, performance, and security of memory encryption and authentication", In Computer Architecture, 2006. ISCA '06, 33rd International Symposium on, 2006, pp. 179-190.

Yang et al., "Memristive devices for computing", Nature nanotechnology, vol. 8, No. 1, 2013, pp. 13-24.

Yang et al., "Why nothing matters: The impact of zeroing", In Proceedings of the 2011 ACM International Conference on Object Oriented Programming Systems Languages and Applications, OOPSLA '11, 2011, pp. 307-324.

Young et al., "Deuce: Write-efficient encryption for non-volatile memories", In Proceedings of the Twentieth International Conference on Architectural Support for Programming Languages and Operating Systems, ASPLOS '15, 2015, pp. 33-44.

Zhou et al., "A durable and energy efficient main memory using phase change memory technology", In Proceedings of the 36th Annual International Symposium on Computer Architecture, ISCA '09, 2009, pp. 14-23.

Partial Supplementary European Search Report received for EP Patent Application No. 15905603.5, dated Jan. 19, 2018, 12 pages.

\* cited by examiner

US 10,671,546 B2

CRYPTOGRAPHIC-BASED INITIALIZATION OF MEMORY CONTENT

BACKGROUND

For purposes of analyzing relatively large data sets (often called "big data"), computer systems have ever-increasingly large main memories. One type of memory is a volatile memory, such as a Dynamic Random Access Memory (DRAM). A volatile memory loses its content in the event of a power loss. Moreover, the memory cells of certain volatile memories, such as the DRAM, are frequently refreshed to avoid data loss. Another type of memory is a non-volatile memory (NVM), which retains its data in the event of a power loss. The memory cells of an NVM retain their stored data without being refreshed.

A memory may be located in an insecure area of an electronic system. As such, data stored in the memory may be encrypted to prevent unauthorized access to the underlying information.

DETAILED DESCRIPTION

Figure 1:
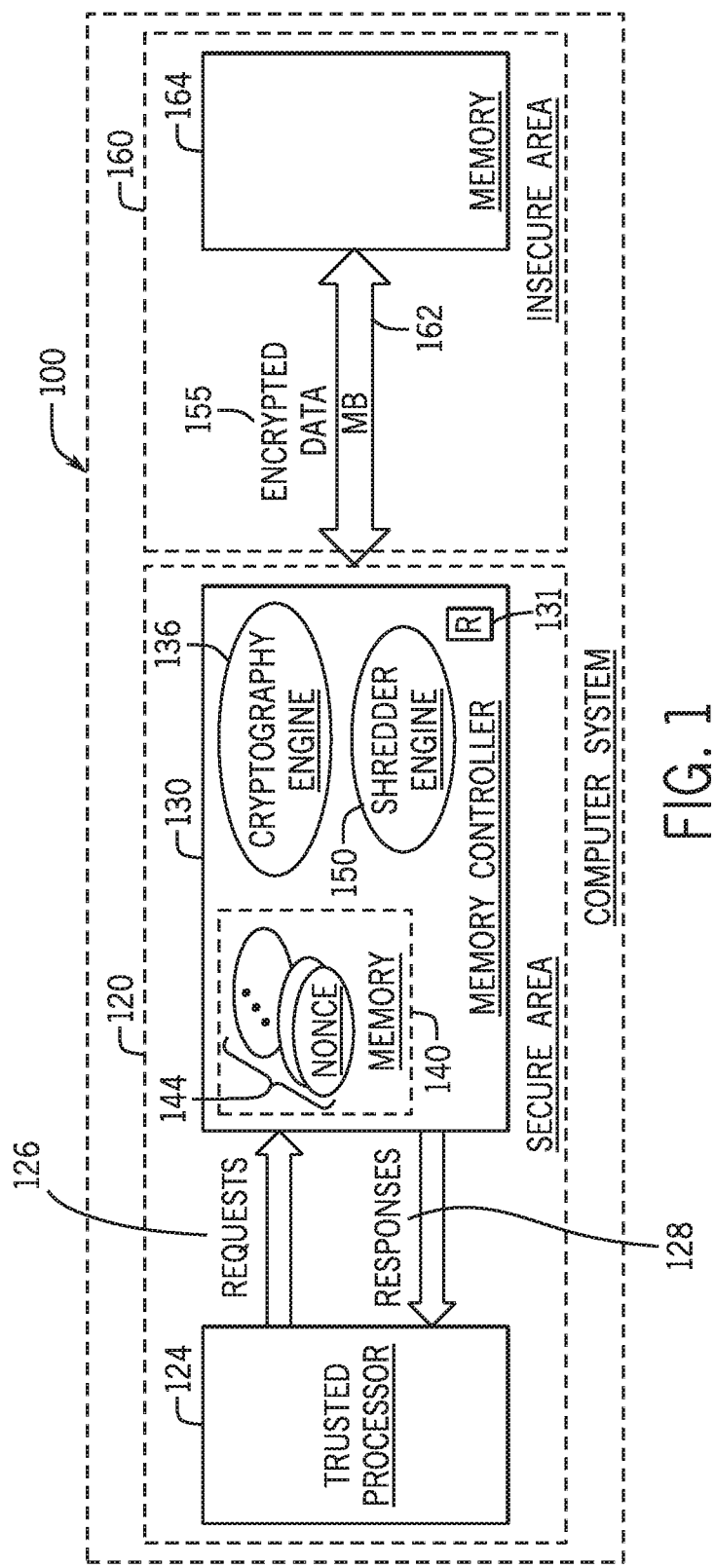
FIG. 1 is a schematic diagram of a computer system according to an example implementation.

A computer system may employ measures to protect data associated with applications executing on the system from being exposed to internal or external adversaries. One approach to protect data from one application from being visible to another application includes clearing, or "zeroing," units of memory (pages of memory, for example) before the units are allocated to a new application. In this manner, the computer system may zero a given memory unit by writing zeros to all of the addressable locations of the unit. Due to the zeroing, the newly-allocated units of memory do not contain data traces left behind by other applications to which the units were previously allocated.

Non-Volatile Memories (NVMs) are ever-increasingly being used as replacements for volatile memories. As examples, NVMs include flash memories, memristors, phase change memories, ferroelectric random access memories (F-RAMs) and magnetoresistive random access memories (MRAMs), to name a few. In general, an NVM may have advantages over a volatile memory. For example, the NVM may be more scalable, as compared to a volatile memory, thereby providing a higher storage density. Other advantages may be that NVM cells are not refreshed (thereby not consuming refresh power); the NVM does not lose its content upon power loss; and the NVM allows for the potential of persistent data.

A potential challenge, however, with using zeroing to protect application data in an NVM-based computer system is that the NVM may have a relatively large write latency (i.e., an NVM device may take a relatively longer time to store data, as compared to a volatile memory device). Therefore, for example, zeroing an NVM page may consume more time than zeroing a page of volatile memory. Another potential challenge in zeroing NVM is that an NVM cell may be written a finite number of times before the cell is no longer usable. Therefore, the above-described zeroing approach may potentially impact the lifetime of the NVM.

In accordance with example implementations, instead of writing zeros to a given memory region to initialize the region, a memory controller is constructed to change a nonce that is used along with a key as part of a decryption process to decrypt content from the region. Therefore, in effect, the memory controller "shreds" the content contained in the initialized memory region, without actually writing to the region.

More specifically, in accordance with example implementations, a computer system includes a memory controller that is constructed to store content in an encrypted memory as well as retrieve content from the memory. In this manner, the memory controller encrypts plaintext data to be stored in the memory and decrypts encrypted data retrieved from the memory to generate corresponding plaintext data.

In accordance with example implementations, the memory controller changes a nonce value that is used to encrypt data stored in a given memory region (a region having cache line-aligned boundaries, for example) for purposes of initializing the region. More specifically, the memory controller encrypts plaintext data that is stored in given region of the memory based on a stored nonce value and a key (a key associated with the memory controller, for example). In this regard, the memory controller uses the key and the nonce value to 1.) encrypt plaintext data for purposes of storing content in the memory region; and 2.) decrypt encrypted data retrieved from the memory region for purposes of reading content from the region. The memory controller changes the nonce value each time data is written to the memory region. In accordance with example implementations, the memory controller changes the nonce value for another purpose: in response to a request to initialize a given memory region (a request to shred the region or zero fill the region, as examples), the memory controller changes the nonce value to effectively initialize the region by preventing the content of the region from being recovered.

As a more specific example, FIG. 1 depicts a computer system 100 in accordance with example implementations. The computer system 100 contains actual hardware and actual machine executable instructions, or "software." In this manner, the computer system 100 may contain such hardware as one or multiple trusted processors 124; a memory controller 130, and a memory 164. The machine executable instructions may include, as examples, instructions that when executed by one or multiple processors (such as trusted processor 124) form an operating system; one or multiple device drivers; one or multiple applications, and so forth. In accordance with example implementations, the memory 164 may be an NVM, although the memory 164 may be a volatile memory, in accordance with further example implementations.

The computer system 100 includes a trusted, secure area 120, which contains trusted components, such as the trusted processor 124 and the memory controller 130. Because these components are trusted, communications between the trusted processor 124 and the memory controller 130 are not encrypted. In general, the trusted processor 124 generates memory requests 126 for the memory 164, and these requests are handled by the memory controller 130.

For example, the memory request 126 may be a read request to read data from a particular region (a cache line boundary-aligned region, for example) of the memory 164, and the read request identifies the address of the region. As another example, the memory request 126 may be a write request to write plaintext data to a particular region of the memory 164, and the write request contains the plaintext data and identifies the address of the region. As another example, the memory request 126 may be an initialization request, such as a shred request, to initialize a particular region of the memory so that the initialized region may be allocated to an application.

In this manner, the initialization request may be a request (a zero fill request, for example) for the memory controller 130 to store a predetermined data pattern (all zeroes, for example) in the region of memory. The initialization request may be a request for the memory controller 130 to shred the content of the region of memory, i.e., a request to alter the content that is currently stored in the region at the time of the request so that the content may not be recovered.

The initialization request may be communicated to the memory controller 130 a number of different ways, depending on the particular implementation. For example, in accordance with some implementations, the initialization request may be communicated to the memory controller 130 by the trusted processor 124 executing machine executable instructions that cause a user level process to pass a virtual address to a kernel of an operating system using a system call; and in response to the system call, the operating system kernel may write the physical address of the page to be initialized to a memory-mapped input/output (I/O) register 131 of the memory controller 130. It is noted that such a mechanism may be used, in lieu of having applications directly write to the register 131, as such application access may introduce a security vulnerability.

As depicted in FIG. 1, the memory controller 130 may also furnish responses 128 to the trusted processor 124. As examples, the responses 128 may include a response to a read request to the memory 164, which includes the read, plaintext data. The responses 128 may also include acknowledgments by the memory controller 130 that write and shred requests have been processed by the controller 130.

In general, the memory controller 130 controls the flow of data into and out of the memory 164 in response to requests that are provided by requestors of the computer system 100, such as the trusted processor 124. Other requestors may include other trusted processors, a direct memory access (DMA) controller, a graphics controller, and so forth.

The memory controller 130 communicates encrypted data 155 with the memory 164, as the memory 164, along with the memory bus 162 used to communicate the data 155, may be located in what is considered an untrusted, or insecure, area 160 of the computer system 100. In accordance with example implementations, to process a request 126 that involves writing data in or reading data from the memory 164, the memory controller 130 generates the appropriate bus signals on the memory bus 162. For example, to write data to the memory 164, the memory controller 130 provides control signals that identify the bus operation as being a write operation, address signals that represent an address of the memory 120 in which the encrypted data 155 is to be stored and data signals that represent the encrypted data 155. The memory 164 responds by storing the data in the memory cells associated with the address.

To read data from the memory 164, the memory controller 130 provides signals to the memory bus 162, such as control signals that identify the bus operation as being a read operation and address signals that represent a physical address of the memory 164 from which the encrypted data 155 is to be retrieved. The memory 130 responds by providing data signals to the memory bus 162, which represent the encrypted data 155 stored in the memory cells associated with the address.

In accordance with example implementations, the memory controller 130 may be an integrated circuit (IC). Moreover, in accordance with example implementations, the memory controller 130 may be part of an IC contains a bridge (a north bridge, for example) that is separate from the trusted processor 124. In accordance with further example implementations, the memory controller 130 may be part of a semiconductor package that contains the trusted processor 124. In accordance with some implementations, the trusted processor 124 and the memory controller 130 may be part of a trusted platform module (TPM).

For purposes of encrypting data that is communicated to the memory 164 as well as decrypting data received from the memory 164, the memory controller 130 includes a cryptography engine 136. In accordance with example implementations, for purposes of encrypting and decrypting data, the cryptography engine 136 uses a block cipher that has a counter mode of operation (an Advanced Encryption Standard (AES)-based cipher, for example). As depicted in FIG. 1, in accordance with example implementations, the controller 130 further includes a shredder engine 150, which responds to initialization (shred requests, for example) for purposes of initializing (shredding, for example) regions of the memory 164, as described further herein.

Among its other features, the memory controller 130 may include a local memory 140, which stores nonce values 144, which are used for purposes of encrypting and decrypting data for purposes of storing and retrieving content to and from the memory 164, as further described herein. In accordance with some implementations, the memory 140 may be a volatile memory, such as a static random access memory (SRAM). Moreover, in accordance with example implementations, the memory controller 130 may backup the content of the memory 140 to an NVM (not shown) of the secure area 120 for purposes of allowing recovery of content from the memory 164 (using the nonce values stored in the NVM) in the event of a power failure.

Figure 2A:
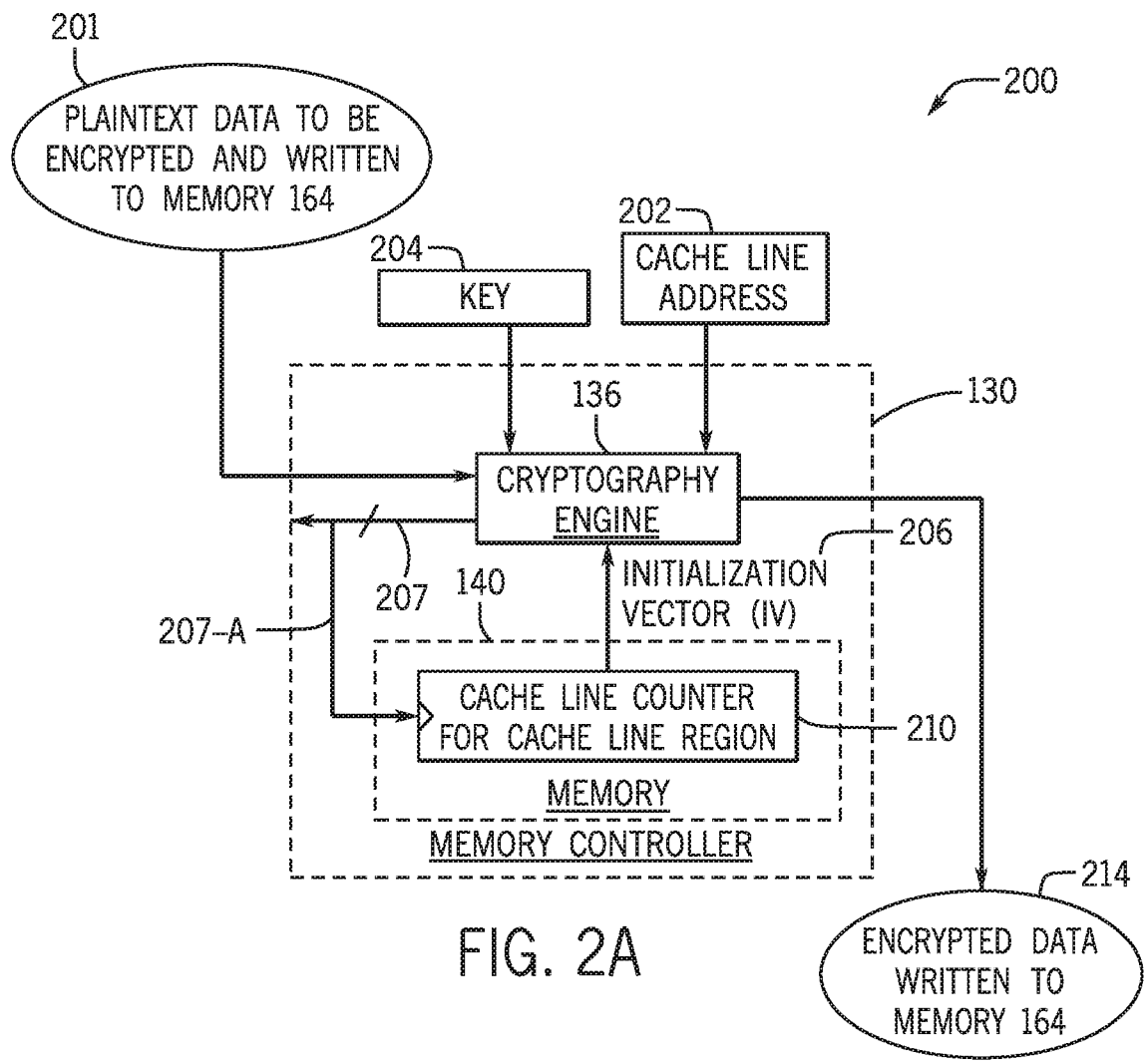
FIG. 2A is an illustration of operations performed by a memory controller of the computer system to store content in an encrypted memory of the system according to an example implementation.

FIG. 2A is an illustration 200 of operations performed by the memory controller 130 to store content in the memory 164, in accordance with example implementations. Referring to FIG. 2A in conjunction with FIG. 1, in accordance with example implementations, the cryptography engine 136 uses an AES-based block cipher in a counter mode, which, in turn, uses counters, which have associated counter values, called "initialization vectors (IVs) 206" herein. To store content in the memory 164 in connection with a write request that is directed to a cache line boundary-aligned region (herein called a "cache line region") of the memory 164, the cryptography engine 136 encrypts plaintext data 201 that is provided as part of the request based on a key 204, a cache line address 202 and an IV 206.

The key 204, in accordance with example implementations, is a key that is associated with the memory controller 130 and is used by the memory controller 130 for purposes of encrypting and decrypting all of its data. In accordance with further example implementations, the key may be a key that is associated with a particular region of the memory 140, and as such, the memory controller 130 may select the key based on a particular memory region being accessed. The IV 206 depends on a counter value that is provided by a cache line counter 210, which is associated with the cache line region associated with the write operation. In this manner, in accordance with example implementations, the memory 140 stores multiple counters 210, where each counter 210 is associated with a corresponding cache line region of the memory 164.

In accordance with example implementations, every time the memory controller 130 writes data to a given cache line region, the cryptography engine 136 increments the corresponding cache line counter 210 to increment the corresponding IV 206. The incrementing of the counter 210 is depicted in FIG. 2A by a counter increment output 207-A of the cryptography engine 201. In this manner, in accordance with example implementations, the cryptography engine 136 has counter increment outputs 207 that increment associated counters 201 when the memory controller encrypts data for storage in the associated cache line regions of the memory 164. In accordance with example implementations, the cryptography engine 136 encrypts the plaintext data 201 based on the key 204, cache address 202 and the IV 206 to generate encrypted data 214 that is written by the memory controller 130 to the memory 164.

Figure 2B:
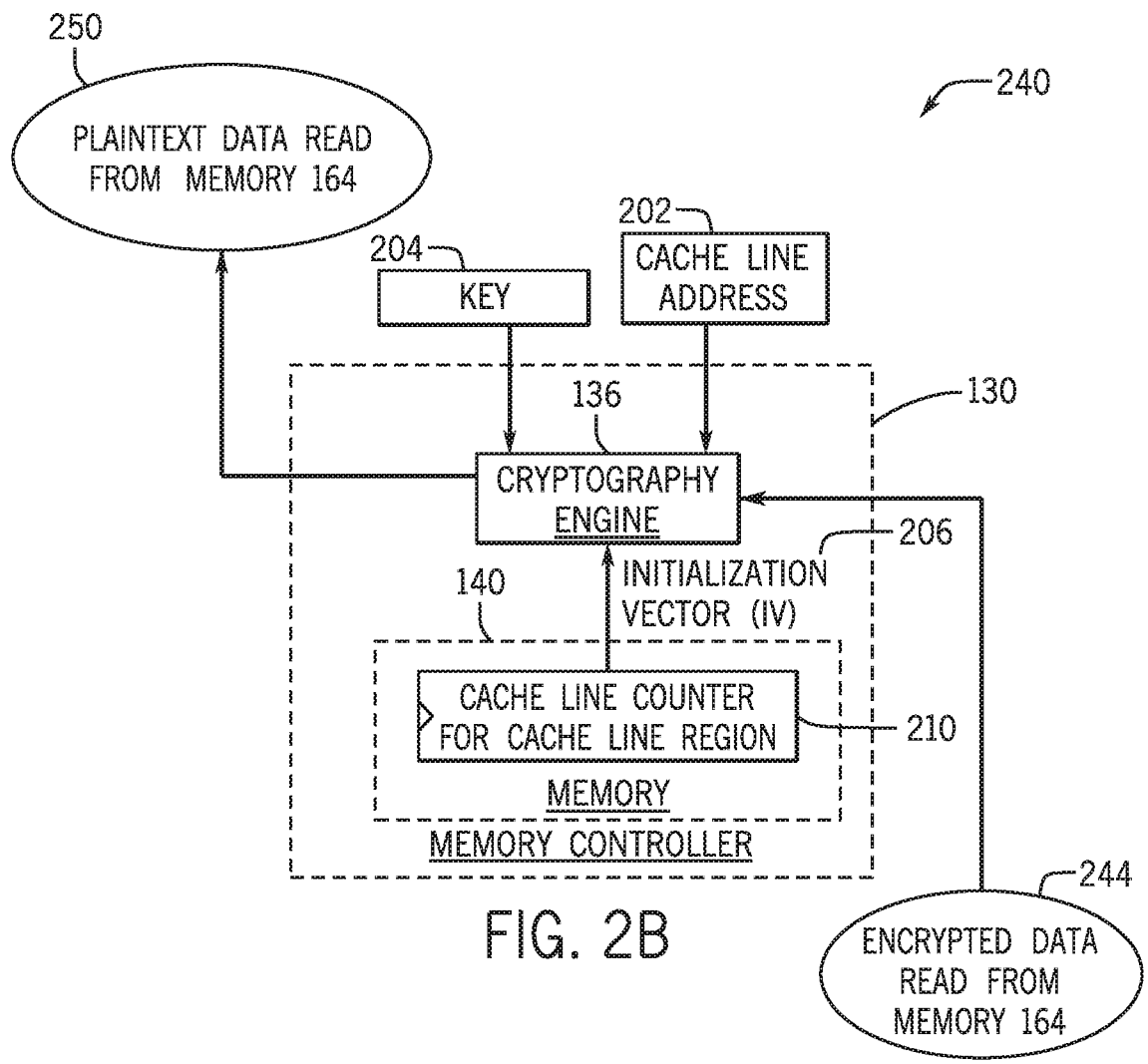
FIG. 2B is an illustration of operations performed by the memory controller to read content from the encrypted memory according to an example implementation.

FIG. 2B depicts operations 240 performed by the memory controller 130 to retrieve the content from the cache line region in response to a read request that targets the region. Referring to FIG. 2B in conjunction with FIG. 1, the IV 206, i.e., the value of the counter 210, does not change if new data is not written to the cache line region. Therefore, to retrieve the data corresponding to the cache line region from the memory 164, the cryptography engine 136 applies the same IV 206 used to encrypt the data (before storing the encrypted data in the region) to decrypt data 244 retrieved from the memory 164 for purposes of producing corresponding plaintext data 250.

Figure 3:
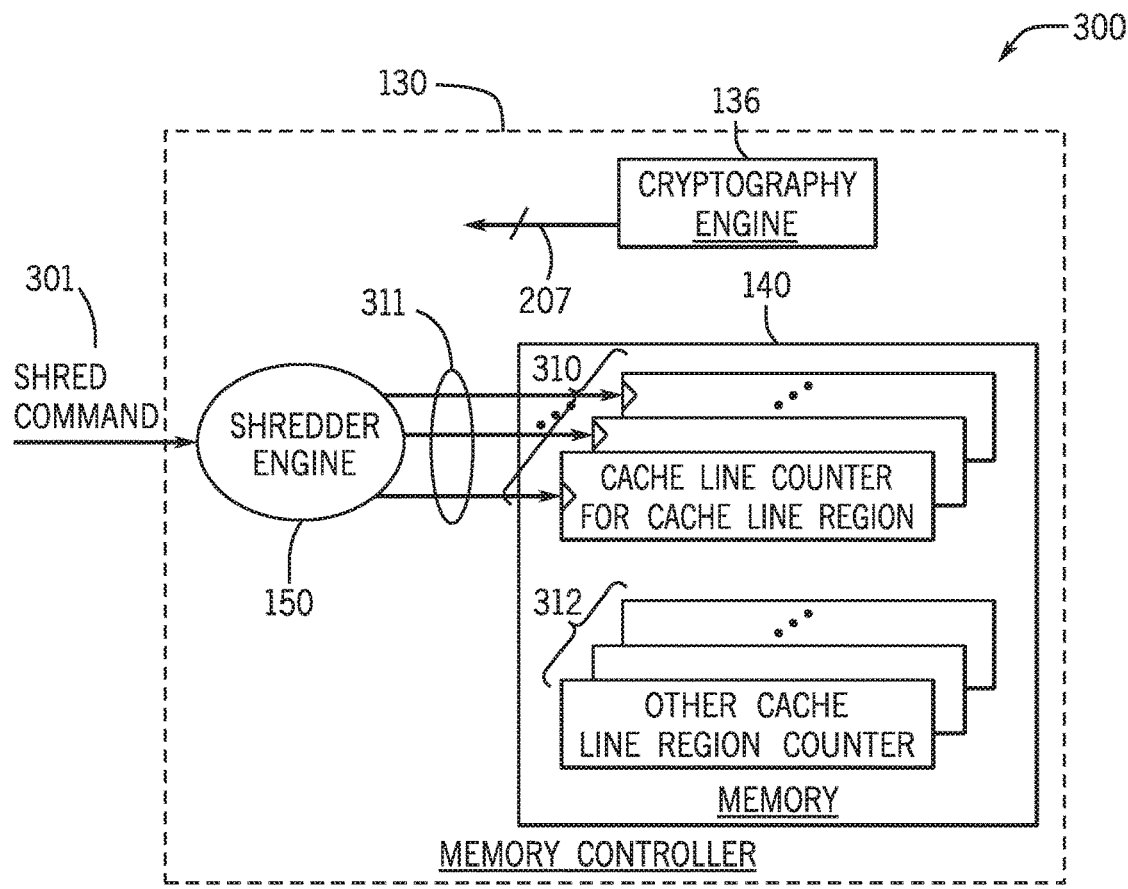
FIG. 3 is an illustration of operations performed by the memory controller to shred content stored in the memory according to an example implementation.

FIG. 3 generally depicts operations 300 that are performed by the memory controller 130 in response to receiving a shred command 301 to shred a given page of the memory 164. The page is associated with multiple cache line regions. Referring to FIG. 3 in conjunction with FIG. 1, in lieu of writing zeroes or other content to the given page of memory 164, the shredder engine 150 changes cache line counters 310 (and changes the corresponding IVs 206, for example) that correspond to the cache line regions of the shredded page. In this manner, FIG. 3 depicts the shredder engine 150 provide counter increment outputs 311 that increment the counters 311 that are associated with the page being shredded; and FIG. 3 also depicts other cache line counters 312 that are not associated with the page being shredded. By changing the counter values, the content of the shredded page is effectively rendered as "garbage," as the memory controller 130 no longer stores the IVs 206 for decrypting the content of the page.

Figure 4:
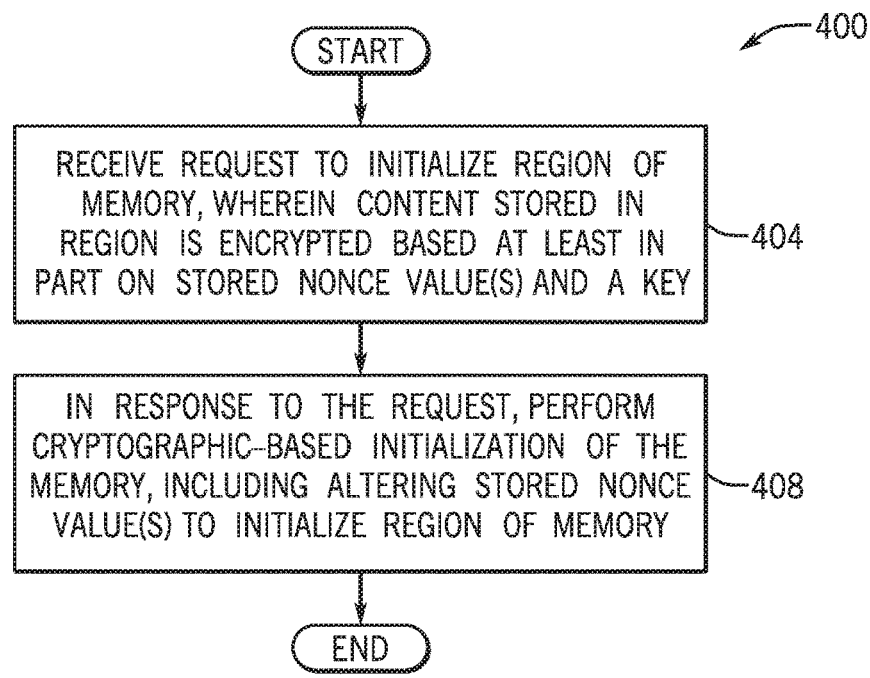
FIG. 4 is a flow diagram depicting a cryptographic-based technique to initialize memory content according to an example implementation.

Thus, referring to FIG. 4, in accordance with example implementations, a technique 400 includes receiving (block 404) a request to initialize a region of memory, where content stored in the region is encrypted based at least in part on one or multiple stored nonce values and a key. The technique 400 includes, in response to the request, performing cryptographic-based initialization of the memory, including altering the stored nonce value(s) to initialize the region of memory, pursuant to block 408.

Figure 5A:
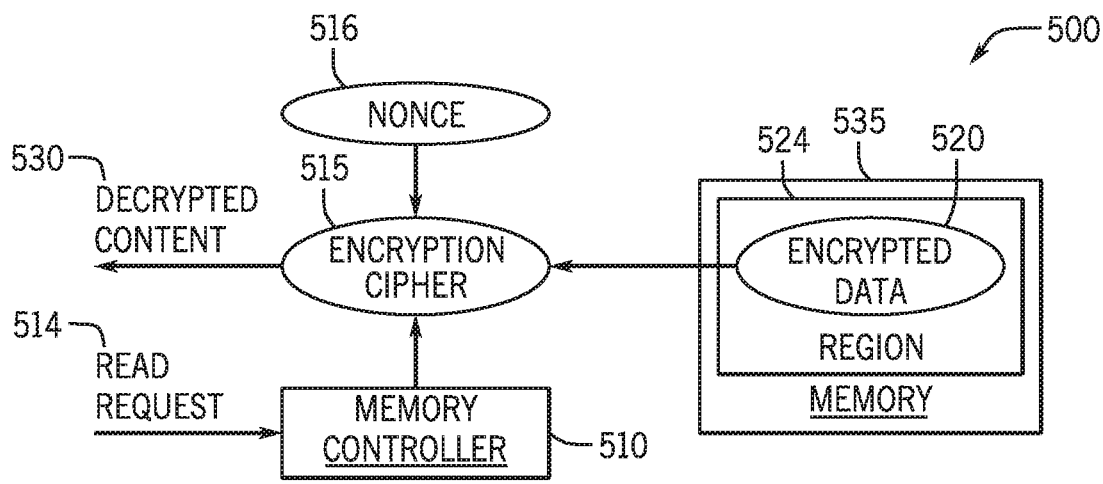
FIG. 5A is an illustration of operations to read content from an encrypted memory according to an example implementation.
Figure 5B:
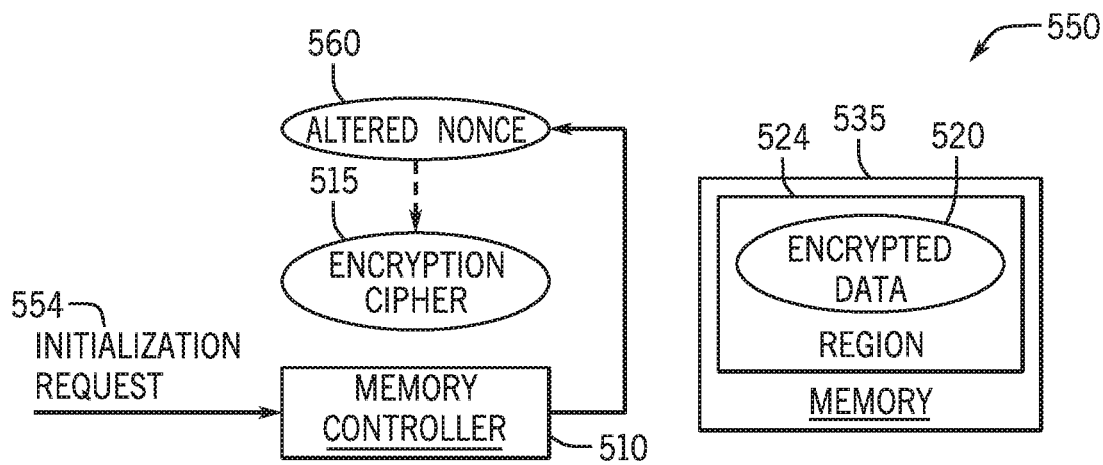
FIG. 5B is an illustration of operations to initialize a region of memory according to an example implementation.

Referring to FIG. 5A in conjunction with FIG. 1, thus, in accordance with example implementations, a memory controller 510, in response to a read request 514, applies a stored nonce value 516 as part of a cipher 515 to decrypt encrypted data 520 targeted in a region 524 of a memory 535 by the read request 514 to provide corresponding decrypted content 530. Referring to FIG. 5B in conjunction with FIG. 5A, in response to receiving an initialization request 554 to initialize the memory region 524, the memory controller 510 alters the stored nonce value 516 to generate an altered nonce 560. Due to this altering of the nonce value, the encrypted data 520 in the region 524 may not be recovered.

Figure 6:
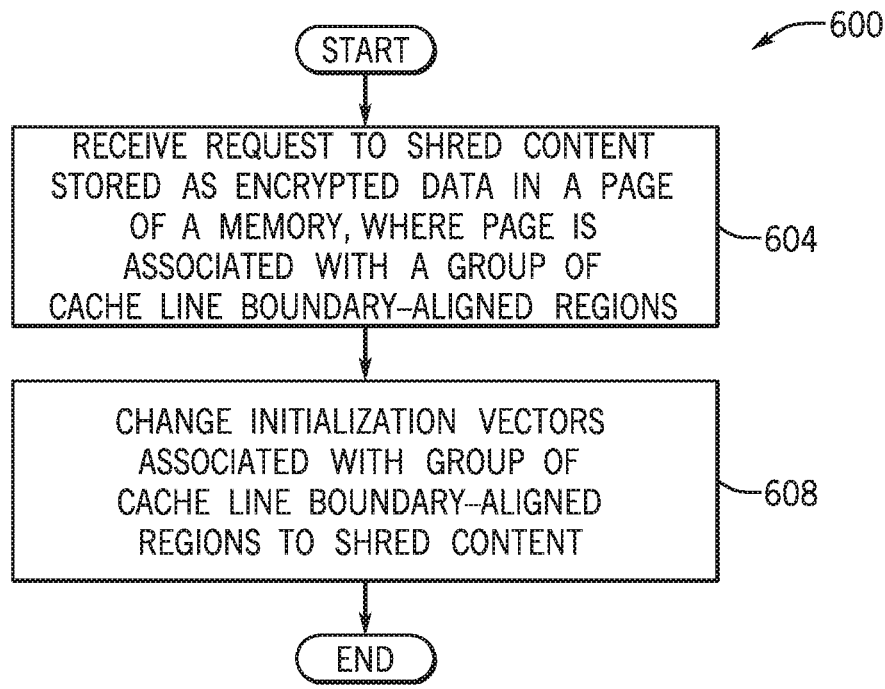
FIG. 6 is a flow diagram of a cryptographic-based technique to shred memory content according to an example implementation.

Referring to FIG. 6, in accordance with example implementations, a technique 600 includes receiving (block 604) a request to shred content, which is stored as encrypted data in a page of a memory. The page is associated with a group of cache line boundary-aligned regions. The technique 600 includes changing (block 608) initialization vectors associated with the group of cache line boundary-aligned regions to shred the content.

In accordance with example implementations, the initialization request may be a zero page or zero fill request, and as such, an operating system of the computer system 100 may expect a block of zeroes to be returned from an initialized page (instead of the returned, shredded "garbage"). Therefore, in accordance with some implementations, the memory controller 130 may return a block of zeroes to the operating system without actually communicating with the memory. For these implementations, the memory controller may track which pages are shredded using the cache line region counter. More specifically, in accordance with example implementations, the cache line region counter may provide an IV 700 that has a format such as the one that is depicted in FIG. 7.

Figure 7:
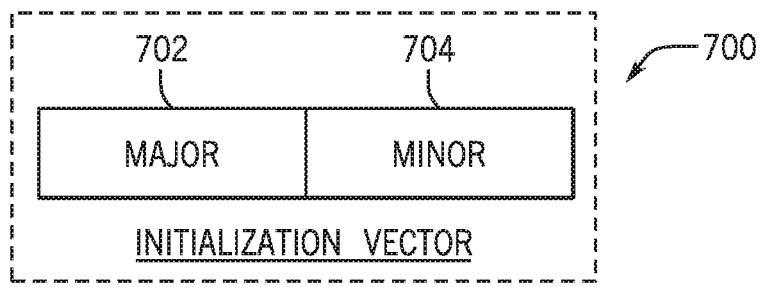
FIG. 7 is an illustration of an initialization vector (IV) according to an example implementation.

Referring to FIG. 7, the IV 700 includes a major counter portion 702 and a minor counter portion 704. In general, the major counter portion 702 of the IV 700 tracks pages and is incremented for different pages of the memory; and the minor portion 704 of the IV 700 corresponds to counter bits that are incremented to generate the different IVs or nonce values for the cache line regions of the page.

In accordance with example implementations, the memory controller 130 sets the minor counter portion 704 to a predetermined bit value to indicate whether the corresponding page is a shredded page. For example, in accordance with some implementations, the memory controller 130 may zero the minor counter portion 704, or set all of the bits of the minor counter portion 704 to zero. Therefore, for these example implementations, when the memory controller 130 shreds a given page, the memory controller 130 may clear the minor counter portion 704; and subsequently, when the memory controller accesses a given page and determines that its associated minor counter portion 704 is zero, then the memory controller returns a block of zeroes to the operating system.

In accordance with some implementations, the memory controller 130 invalidates shredded cache line memory regions. For example, in accordance with some implementations, the shred command may be followed with the execution of PCOMMIT and SFENCE instructions. It is assumed for this approach that the address range of the register 131 (FIG. 1) is declared as persistent, and the memory controller 130 marks the shred command write as being flushed when all of the invalidations have been posted. In accordance with further example implementations, the memory controller 130 may loop to continuously read the register 131 until the register 131 returns the value of zero. The memory controller 130 may then set the value stored in the register 131 to zero after sending out all of the invalidations. Such a waiting loop does not generate any traffic on the memory bus 162.

Other implementations are contemplated, which are within the scope of the appended claims. For example, although shredding of a main memory of a computer system as described herein, the shredding techniques and systems that are described herein may be applied to other memories. For example, in accordance with further example implementations, the memory may be a storage memory of a storage system. As another example, in accordance with further example implementations, the cryptography engine 136 may use another block-based cipher that uses an IV, such as a cipher block chaining (CBC) cipher or a cipher feedback (CFB) cipher.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method performed by a controller, comprising:
storing a plurality of nonce values in a first memory region, wherein the plurality of nonce values are for encrypting data in respective different memory regions;
in response to a read request, retrieving a stored nonce value of the plurality of nonce values in the first memory region, the stored nonce value associated with content in a second memory region of a memory;
decrypting encrypted data in the second memory region using the stored nonce value and a key;
receiving a request to initialize the second memory region of the memory to render the content in the second memory region of the memory unrecoverable; and
in response to the request to initialize the second memory region of the memory to render the content in the second memory region of the memory unrecoverable, performing a cryptographic-based initialization of the second memory region, including altering the stored nonce value in the first memory region to render the content in the second memory region of the memory unrecoverable.

2. The method of claim 1, wherein the stored nonce value comprises a counter value, and altering the stored nonce value comprises altering the counter value.

3. The method of claim 1, wherein the second memory region is associated with a cache line, and altering the stored nonce value comprises changing a count value associated with the cache line.

4. The method of claim 1, wherein the second memory region is associated with a plurality of cache lines and the stored nonce value is one of a plurality of stored nonce values, the method further comprising:
altering the plurality of stored nonce values to shred the content in the second memory region to render the content in the second memory region unrecoverable.

5. The method of claim 1, further comprising:
prior to receiving the request to initialize the second memory region, encrypting the content in the second memory region based at least in part on the stored nonce value, the key, and a cache line address to provide the encrypted data.

6. The method of claim 1, wherein the request to initialize the second memory region is a zero fill request to store all zeros in the second memory region, and the altering of the stored nonce value is performed in response to the zero fill request in lieu of writing zeroes to the second memory region.

7. The method of claim 1, wherein the altering of the stored nonce value in response to the request to initialize the second memory region renders the content in the second memory region into garbage content.

8. The method of claim 1, wherein the controller is a memory controller, the stored nonce value is stored in the first memory region of a local memory of the memory controller, and the key is associated with the memory controller.

9. An apparatus comprising:
a first memory to store a plurality of initialization vectors associated with a plurality of cache lines, wherein the plurality of initialization vectors are for encrypting data in respective different memory regions of a second memory; and
a memory controller to:
in response to a read request, retrieve stored initialization vectors of the plurality of initialization vectors in the first memory, the stored initialization vectors associated with content in a corresponding memory region of the second memory;
decrypt encrypted data in the corresponding memory region using the stored initialization vectors and a key;
receive a request to shred the corresponding memory region to render the content in the corresponding memory region unrecoverable, the corresponding memory region associated with a group of cache lines of the plurality of cache lines; and
in response to the request to shred the corresponding memory region, alter the stored initialization vectors associated with the group of cache lines to shred the corresponding memory region that renders the content in the corresponding memory region unrecoverable.

10. The apparatus of claim 9, wherein the corresponding memory region comprises a page of the second memory.

11. The apparatus of claim 9, wherein the first memory comprises a volatile memory, and the memory controller is to back up content of the first memory to a non-volatile memory.

12. The apparatus of claim 9, wherein the memory controller is to decrypt the encrypted data further based at least in part on an address of the encrypted data.

13. The apparatus of claim 9, wherein the request to shred the corresponding memory region is a zero fill request to store all zeros in the corresponding memory region.

14. The apparatus of claim 9, wherein the memory controller is to invalidate the group of cache lines in response to the request to shred the corresponding memory region.

15. The apparatus of claim 9, wherein the memory controller is to, in response to a request to write data to a given cache line of the plurality of cache lines:
change a given initialization vector of the plurality of initialization vectors;
encrypt data of the given cache line using the changed given initialization vector, wherein the request to shred is different from a request to write data.

16. The apparatus of claim 9, wherein the altering of the stored initialization vectors in response to the request to shred renders the content of the corresponding memory region into garbage content.

17. A system comprising:
a first memory to store a plurality of nonce values, wherein the plurality of nonce values are for encrypting data in respective different memory regions of a second memory; and
a memory controller to:
in response to a read request, retrieve a stored nonce value of the plurality of nonce values in the first memory, the stored nonce value associated with content in a corresponding memory region of the second memory;
decrypt encrypted data in the corresponding memory region using the stored nonce value and a key;
receive an initialization request to initialize the corresponding memory region of the second memory to render the content in the corresponding memory region of the second memory unrecoverable; and
in response to the initialization request, perform a cryptographic-based initialization of the corresponding memory region, including altering the stored nonce value to render the content in the corresponding memory region of the second memory unrecoverable.

18. The system of claim 17, wherein:
the corresponding memory region comprises a page;
the page comprises a plurality of cache line regions;
the stored nonce value is associated with a given cache line region of the plurality of cache line regions; and
the encrypted data is stored in the given cache line region.

19. The system of claim 18, wherein the memory controller is to, in response to the initialization request, change other nonce values associated with one or more cache line regions other than the given cache line region.

* * * * *